United States Patent [19]

Dirkes

[11] 4,325,352
[45] Apr. 20, 1982

[54] INTERNAL RECIRCULATION DEVICE

[75] Inventor: James V. Dirkes, Grand Rapids, Mich.

[73] Assignee: Rapid Engineering Inc., Mich.

[21] Appl. No.: 191,288

[22] Filed: Sep. 26, 1980

[51] Int. Cl.³ .......................... F24H 3/02; F25B 29/00
[52] U.S. Cl. .............................. 126/110 A; 126/110 C; 126/116 R; 165/16
[58] Field of Search ........................... 165/16; 236/13; 126/116 R, 116 A, 110 R, 110 A, 110 B, 110 C, 110 D, 110 E, 112, 105 R

[56] References Cited

U.S. PATENT DOCUMENTS

| 1,440,867 | 1/1923 | Ellison | 126/110 A |
| 2,109,512 | 3/1938 | Stacey | 126/110 A |
| 2,146,071 | 2/1939 | Horvath | 126/110 A |
| 2,551,956 | 5/1951 | Lund | 126/110 A |
| 3,405,758 | 10/1968 | Walker | 236/13 |
| 3,618,659 | 11/1971 | Rawal | 165/16 |
| 3,782,448 | 1/1974 | Clark | 165/16 |
| 4,178,770 | 12/1979 | Fox | 165/16 |
| 4,210,278 | 7/1980 | Obler | 165/16 |
| 4,272,966 | 6/1981 | Niemann et al. | 165/16 |
| 4,293,027 | 10/1981 | Tepe | 165/16 |

Primary Examiner—Daniel J. O'Connor
Attorney, Agent, or Firm—Wilfred O. Schmidt

[57] ABSTRACT

A method for converting a direct fired gas heating apparatus from one having a constant volume discharge air flow characteristics to one having variable volume characteristics by the use of an internally recirculating volume discharge air flow increment.

1 Claim, 2 Drawing Figures

INTERNAL RECIRCULATION DEVICE

The present invention relates to a method for regulating the volume discharge air flow from a direct gas fired heating apparatus by recirculating a controlled volume increment, which without re-heating is mixed with both heated and unheated fresh air and is again pulled through and discharged in the succeeding volume discharge air flow and more particularly it relates to a method for regulating the volume discharge air flow from the said apparatus by recirculating a given volume increment therefrom through a controlled damper adjacent the blower discharge and without re-heating, mixing the said volume increment with both heated and unheated fresh air downstream of the burner prior to discharge from the blower.

The invention, by reason that the recirculated air is isolated from the air evacuated from the building's interior, finds important application wherever a variable volume of heated fresh air is needed to displace air borne contaminates which are deleterious to workers, to the product being handled or to the operations carried on. The air borne contaminates such as these are commonly found in paint spray shops, foundries, chemical plants, welding shops, large restaurants, bowling alleys and the like.

The present invention employs a constant speed blower, a direct gas fired burner upstream of the blower and contained in a profile opening, an opening adjacent to the blower discharge served by a diverting damper which opening communicates with the building's interior and an opening adjacent the profile burner opening which communicates with the outdoors. The diverting damper and the profile damper are mechanically linked to operate in opposition to one another, that is, the range for the diverting damper, which can be manually or automatically selected, is 0% to 80% of the rated blower capacity with the range for the profile damper being of a complementary nature is 100% to 20% of the rated capacity.

In order that the present embodiment operate with optimum efficiency at the 100% of the rated blower capacity, the incoming air must flow at the recommended velocity of 3000 feet per minute (fpm) and the pressure drop across the burner must be at the recommended value of minus 0.56 water column.

The present embodiment of the invention is designed to assure that the proper volume discharge air flow is delivered at all times. The diverting damper is pre set, manually or automatically, to recirculate the volume increment in excess of that needed to heat the building interior through the apparatus. The introduction of the recirculated air into the apparatus supplements the air flow already pulled from the outside by the blower. As the result, the available blower capacity is reduced.

Therefore, to maintain the said operating statistics the profile damper must automatically adjust and offer resistance to reduce the air flow by the same percentage that the diverting damper has controlled the volume increment. The air flow through the profile damper is of a complementary percentage to the percentage of air flow allowed through the diverting damper.

An object of the invention is to provide a heating apparatus which has variable volume discharge air flow characteristics.

Another object of the invention is to provide a heating apparatus which utilizes recirculation of air to regulate the volume discharge air flow without the danger of a build up of contaminates peculiar to the burning of the gaseous fuel or the danger of contamination by foreign contaminates borne by the air to be evacuated.

Another object of the invention is to provide a heating apparatus in which the incoming air stream velocity and pressure differential are maintained at a given level over the contained burner irrespective of the regulation of the volume discharge air flow.

Another object is to provide a heating apparatus wherein the incoming air is divided; a portion delivered to the burner to support combustion and the other portion bypassing the burner and delivered downstream into the presence of the heat developed by the burning of the fuel and the air recirculated around and through the blower, the total volume of air so proportioned that an even temperature throughout the outlet area of the heating device is maintained.

Other objects and features of the invention will be appreciated and become apparent to those skilled in the art to which the invention pertains upon consideration of the accompanying drawings and the following detailed description wherein an exemplary embodiment of the invention is enclosed.

In the drawings forming a part of the specification

Figure 1:
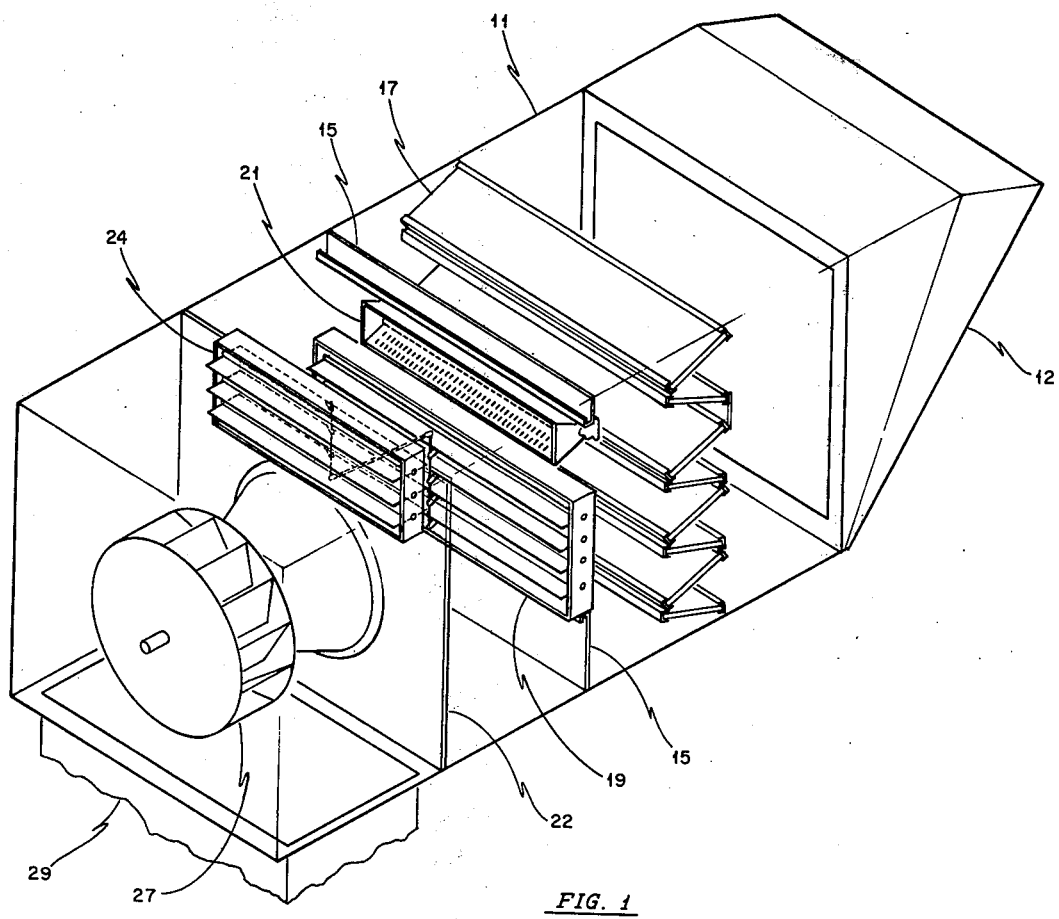
FIG. 1 is an isometric view of the embodiment of the invention.
Figure 2:
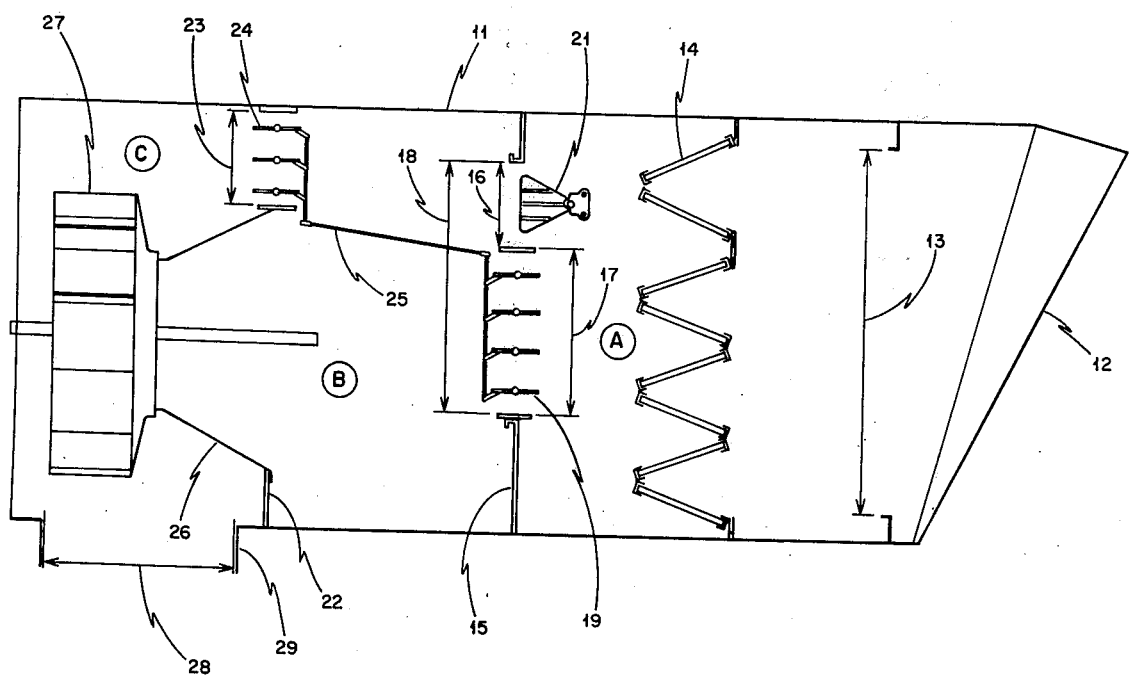
FIG. 2 is a diagrametic view showing the apparatus of FIG. 1.

FIG. 1 indicates a general rectangular housing 11 connected at its inlet end to a weather hood 12. A filter 14 filters the incoming air downstream of the inlet air admitting opening 13 in communication with the outdoors. The filter 14 is of the conventional type removably mounted in channel frames so that they may be readily installed and serviced.

A profile partition 15 compartmentalizes the housing 11 into chamber A and B. The profile partition is apertured by the minor profile opening 16 and major profile opening 17, which together define the total profile opening 18 which opening is in communication with chambers A and B. An open flame gas burner 21 is contained in the minor profile opening 16 and a profile damper 19 controls the flow of air through the major profile opening 17.

The open flame gas burner 21 is of a known type similar to that illustrated and described in U.S. Pat. No. 3,287,289. The said burner has a high ratio between its maximum and minimum rate of operation on the order of 25 to 1 and readily adjusts to assure smooth and continuous variation in heat output.

A bulkhead 22 further compartmentalizes the housing 11 to define the chambers B and C. The bulkhead 22 is apertured by a discharge admitting opening 23 in communication with the chambers B and C and is served by a diverting damper 24 to control the increment of volume discharge air flow to be recirculated through the housing 11.

A constant speed blower 27 divides the volume discharge air flow through the discharge admitting opening 23 and downward into the building through outlet opening 28 contained in the outlet duct 29.

The area of chamber B plus the areas of the total profile opening 18 and discharge air admitting opening 23 constitute the total area of the passage or flow path from the inlet air admitting opening 13 to the outlet opening 28.

At least two (2) temperature sensors and one pressure sensor (not shown) are suitably located within the building interior to be heated. One temperature sensor regulates the flow of the gaseous fuel to the burner, i.e. the volume of fuel flowing to the burner varies in direct proportion to the rise in temperature desired. The other temperature sensor in combination with the pressure sensor control the operation of the diverting damper 24.

In operation the constant speed blower 27 is manually or automatically started and induces the recommended air stream velocity and pressure drop across the open flame burner 21.

Assuming the burner 21 has already been ignited and stands with a minimum fire, a building temperature less than the pre-selected temperature range, will energize the control circuit (not shown) to admit a greater amount of gaseous fuel to the burner 21. Thereafter the control circuit meters the gaseous fuel to maintain the temperature within the desired temperature range.

As aforementioned, the chamber A includes the burner 21 over which the outdoor air is drawn through the inlet air admitting opening 13 and filtered by filter 14. The resistance imposed by the profile damper 19 on the air flow between chambers A and B is determinative of the air speed velocity and pressure drop over the burner 21.

The chamber B is the compartment wherein the heated air from burner 21, the unheated air through the profile damper 19 and the recirculated air through diverting damper 24 are mixed.

The chamber C includes the blower 27, the rated capacity source for drawing the outdoor air over the burner 21 and through the profile damper 19 and pushing a volume increment of the volume discharge air flow through the discharge air admitting opening 23 into chamber B. The mechanical linkage between the diverting damper 24 and the profile damper 19 make the profile dampers resistance to air flow dependant upon the diverting dampers pre-selected setting.

Therefore, as the volume of heated air desired has been determined beforehand and the diverting damper 24 is pre-set either manually or automatically accordingly, the mechanically linked profile damper 19 will adjust to permit the flow of that percentage of air which complements the percentage flowing through the diverting damper 24, and the flow through the profile damper will equal the volume discharge air flow delivered into the building.

The recirculated volume increment will flow from blower 27 in chamber C through the discharge admitting opening 23 in chamber B where it will be mixed with the oncoming airstreams of heated and unheated air and again discharge through the blower. The recirculated air acts as a turbulent to aid mixing of air to attain a uniform temperature distribution at the outlet, but also serves as a controlled release valve whereby the subject heating apparatus of constant volume discharge air flow characteristic is converted to one having variable characteristic.

The invention has been described with reference to specific structural characteristics of a housing together with a known type of open flame burner. Various modifications may be made there without departing from the spirit and scope of the invention as set forth in the appended claim.

What is claimed is:

1. A direct gas fired heating apparatus for supplying a variable volume discharge air flow output to a building comprising a housing having an air inlet and an air outlet, a profile partition and a bulkhead partition; the said bulkhead partition situated downstream of the said profile partition and compartmentalizing the said housing into a first, second and third chamber; an aperture in the said profile partition in communication with the said first and said second chambers and an aperture in the bulkhead partition in communication with said second and third chambers, each of said apertures served by a first and second damping means respectively which are mechanically interlocked in opposition to each other, a burner assembly supported in the housing and in spaced relationship with the upper part of the aperture in the said profile partition not served by the first damping means, a blower assembly supported in the bulkhead partition for flowing a low pressure air stream forwardly past the burner and through the said aperture of the said profile partition at a substantial constant velocity, wherein the said blower assembly forces the volume discharge air flow through both the air outlet into the interior of the building and through the said aperture in the said bulkhead partition for recirculating the volume of air flow output increment recirculated controlled by the resistance imposed by the said aperture of the said bulkhead partition.

* * * * *